(12) United States Patent
Pillar et al.

(10) Patent No.: US 8,774,191 B2
(45) Date of Patent: *Jul. 8, 2014

(54) METHOD AND APPARATUS FOR AUTO DETECTION OF AAL5 TYPE FRAMES FOR VCC AND VPC SWITCHES

(75) Inventors: John Frank Pillar, Nepean (CA);
Bernard St. Denis, Nepean (CA);
Bernard Marchand, Cantley (CA)

(73) Assignee: Ciena Corporation, Hanover, MD (US)

( * ) Notice: Subject to any disclaimer, the term of this patent is extended or adjusted under 35 U.S.C. 154(b) by 353 days.

This patent is subject to a terminal disclaimer.

(21) Appl. No.: 12/896,161

(22) Filed: Oct. 1, 2010

(65) Prior Publication Data

US 2011/0019545 A1   Jan. 27, 2011

Related U.S. Application Data

(63) Continuation of application No. 10/393,805, filed on Mar. 21, 2003, now Pat. No. 7,872,969, which is a continuation of application No. 09/300,790, filed on Apr. 28, 1999, now Pat. No. 6,625,120, which is a continuation-in-part of application No. 08/997,353, filed on Dec. 23, 1997, now Pat. No. 6,345,037.

(51) Int. Cl.
*H04L 12/28* (2006.01)

(52) U.S. Cl.
USPC ............... 370/395.1; 370/395.6; 370/397; 370/412

(58) Field of Classification Search
USPC ............... 370/395.1, 395.6, 397, 412
See application file for complete search history.

(56) References Cited

U.S. PATENT DOCUMENTS

| | | |
|---|---|---|
| 5,357,507 A | 10/1994 | Hughes et al. |
| 5,425,029 A | 6/1995 | Hluchyj et al. |
| 5,490,140 A | 2/1996 | Abensour et al. |
| 5,548,587 A | 8/1996 | Bailey et al. |
| 5,557,607 A | 9/1996 | Holden |
| 5,572,522 A | 11/1996 | Calamvokis et al. |
| 5,583,861 A | 12/1996 | Holden |
| 5,592,476 A | 1/1997 | Calamvokis et al. |
| 5,604,743 A | 2/1997 | Le Guigner et al. |
| 5,623,494 A | 4/1997 | Rostoker et al. |
| 5,694,390 A | 12/1997 | Yamato et al. |
| 5,708,659 A | 1/1998 | Rostoker et al. |
| 5,745,488 A | 4/1998 | Thompson et al. |
| 5,751,698 A | 5/1998 | Cushman et al. |
| 5,777,984 A | 7/1998 | Gun et al. |
| 5,812,527 A | 9/1998 | Kline et al. |

(Continued)

OTHER PUBLICATIONS

David E. McDysan et al., "ATM Theory and Application", McGraw-Hill, 1994, pp. 235-235.

*Primary Examiner* — Andrew Lee
(74) *Attorney, Agent, or Firm* — Muncy, Geissler, Olds & Lowe, P.C.

(57) ABSTRACT

In Asynchronous Transfer Mode (ATM) communications networks, certain congestion control features, such as Partial Packet Discard (PPD) and Early Packet Discard (EPD), operate on ATM cells that have been segmented from ATM Adaptation Layer #5 (AAL5) frames (packets). AAL5 frames are automatically detected by observing transitions of an indicator in the ATM cell header unique to AAL5 traffic. Automatic detection of AAL5 traffic allows enablement of packet-aware cell discarding techniques such as PPD and EPD on a Virtual Channel Connection (VCC) basis, whether in a switch for a VCC or for a Virtual Path Connection (VPC) to which the VCC belongs.

21 Claims, 6 Drawing Sheets

(56) References Cited

U.S. PATENT DOCUMENTS

| | | |
|---|---|---|
| 5,828,653 A | 10/1998 | Goss |
| 5,838,677 A | 11/1998 | Kozaki et al. |
| 5,867,480 A | 2/1999 | Thomas et al. |
| 5,917,828 A | 6/1999 | Thompson |
| 5,923,645 A | 7/1999 | Okuda et al. |
| 5,936,958 A | 8/1999 | Soumiya et al. |
| 5,946,312 A | 8/1999 | Suzuki |
| 6,026,088 A | 2/2000 | Rostoker et al. |
| 6,038,232 A * | 3/2000 | Jung et al. ............ 370/395.64 |
| 6,044,079 A | 3/2000 | Calvignac et al. |
| 6,049,527 A | 4/2000 | Isoyama et al. |
| 6,061,820 A | 5/2000 | Nakakita et al. |
| 6,104,715 A | 8/2000 | Basso et al. |
| 6,122,253 A | 9/2000 | Jones |
| 6,185,186 B1 | 2/2001 | Watanabe |
| 6,195,352 B1 | 2/2001 | Cushman et al. |
| 6,222,839 B1 | 4/2001 | Nakazaki et al. |
| 6,266,327 B1 | 7/2001 | Hernandez-Valencia |
| 6,275,504 B1 | 8/2001 | Kim et al. |
| 6,282,171 B1 | 8/2001 | Adams et al. |
| 6,345,037 B2 | 2/2002 | St-Denis et al. |
| 6,633,541 B1 | 10/2003 | Hijikata et al. |
| 6,708,688 B1 | 3/2004 | Rubin et al. |
| 6,754,206 B1 | 6/2004 | Nattkemper et al. |
| 6,826,151 B1 | 11/2004 | Li et al. |
| 6,967,924 B1 | 11/2005 | Aimoto |

\* cited by examiner

METHOD AND APPARATUS FOR AUTO DETECTION OF AAL5 TYPE FRAMES FOR VCC AND VPC SWITCHES

CROSS-REFERENCE TO RELATED APPLICATION

This application is a Continuation of U.S. patent application Ser. No. 10/393,805, filed Mar. 21, 2003, entitled METHOD AND APPARATUS FOR AUTO DETECTION OF AAL5 TYPE FRAMES FOR VCC AND VPC SWITCHES, which is a Continuation of U.S. patent application Ser. No. 09/300,790, filed Apr. 28, 1999, now U.S. Pat. No. 6,625,120, which is a Continuation-in-part of U.S. patent application Ser. No. 08/997,353, filed Dec. 23, 1997, now U.S. Pat. No. 6,345,037, the entirety of all of which are incorporated herein by reference.

FIELD OF THE INVENTION

The present invention relates to the automatic detection of frames in an asynchronous transfer mode (ATM) communications network. More particularly, the present invention relates to the use of automatic detection of ATM Adaptation Layer #5 (AAL5) frames in an ATM switch to determine whether ATM cells arriving at the switch are part of an AAL5 frame.

BACKGROUND OF THE INVENTION

Identification of the use of AAL5 allows enablement of features such as Partial Packet Discard (PPD) and Early Packet Discard (EPD), as well as variations on PPD and EPD such as Late Packet Discard (LPD) and Random Early Discard (RED), all of which operate only on AAL5 traffic. Such cell discard techniques are known in the art and used to control congestion in an ATM network. These methods operate on AAL5 frames, also referred to in the art as AAL5 packets, which can contain up to 64 KB of payload information segmented into ATM cells. In PPD, once an ATM switch has dropped an ATM cell from an AAL5 frame, then the switch should drop the remaining ATM cells belonging to the same AAL5 frame, except possibly the last cell. The remaining cells are dropped since AAL5 cannot reconstruct the frame at the destination switch absent the dropped cell, since the source must retransmit the entire frame it drops the remaining cells in the frame to prevent unnecessary transmission and use of bandwidth.

Unlike PPD, which acts on cells belonging to frames which have already had some cells admitted to output buffers, EPD acts on cells belonging to frames which have not had any cells admitted to the output buffers. If the available buffer space cannot accommodate all the cells from an AAL5 frame, EPD drops all cells in the frame. Since the source would have to retransmit the entire frame anyway if only cells not accommodated by the buffers were dropped, EPD prevents unnecessary transmission by simply dropping all the cells in the frame before initial transmission. EPD, like PPD, thus serves to prevent unnecessary consumption of network resources, such as buffer space and bandwidth.

When an ATM switch receives a request to set up a new Virtual Channel Connection (VCC), the switch may not know whether the connection will carry AAL5 frames or only individual ATM cells using, e.g., AAL1, AAL2, AAL3/4, or a proprietary AAL protocol. Because packet discard methods operate only on AAL5 frames, an ATM switch must be aware of whether or not the ATM cells it receives are part of an AAL5 frame in order to apply a packet discard strategy.

Furthermore, when the ATM switch switches the VPC within which the VCC operates, the switch is given no information regarding the VCCs in use within the VPC. Moreover, because cells arriving at the switch may be interleaved among a plurality of VCCs in use within the VPC, the rule that AAL5 packets travel across a VCC in sequential order cannot be relied upon in the context of the VPC.

One approach to the problem of determining traffic type at the ATM switch has been to use the optional signaling information element (IE) to identify the traffic as type AAL5. However, because the IE for signaling the AAL type is optional, this method is not always available. A second approach to the problem has been to require an operator having personal knowledge of the type of traffic on the circuit to provision features such as PPD and EPD when the switch initially sets up the circuit. While this is a workable solution for a Permanent Virtual Connection (PVC), it suffers from additional administrative costs and time. For a Switched Virtual Connection (SVC), this solution is not viable, because operator intervention is not possible every time the switch receives a setup request for an SVC.

It is impractical to keep a state variable in data memory for each VCI in a VPC connection because this would require too much memory (64 K locations). Alternatively a smaller set of variables could be maintained in data memory which could be dynamically assigned to currently active VPI/VCI combinations.

If this approach is adopted, a method for indexing or reaching a particular state variable location from a VPI/VCI value must be identified. While using a content addressable memory is the simplest implementation, it is also very expensive. As well, CAM is only available in a limited selection of memory sizes. A linked list structure suffers from the drawback of being slow.

It is desirable, therefore, to provide a scheme for automatically detecting the presence of AAL5 frames on a VCC without relying on the signaling IE or operator intervention.

One approach to the problem of not knowing what VCCs are in use within a VPC is to keep state information on a VCC basis. A VCC is identified by the combination of an 8 or 12-bit Virtual Path Identifier (VPI) and a 16-bit Virtual Channel Identifier (VCI). Thus, a minimum of 16 megabits of data would be required per link in order to allocate a single bit of data to each possible VCC. Such extensive memory allocation runs counter to the philosophy of minimizing the amount of data maintained at the switch which led to the development of the hierarchical structure of VCCs and VPCs.

It is also desirable to provide a quick and cost-effective mechanism to learn which VCCs are in use in a VPC and to automatically detect the presence of AAL5 frames in a switch responsible for switching the VPC.

With automatic detection of AAL5 frames, an ATM switch can enable features such as PPD and EPD in order to protect switch resources and ensure fair treatment among connections. As yet, no ATM standards provide automatic detection of whether a connection carries data that has been segmented using AAL5.

SUMMARY OF THE INVENTION

This invention satisfies those desires by providing a mechanism for automatically detecting the presence of AAL5 frames on a VCC connection (the "channel mechanism") and a further mechanism for use on a VPC connection for identifying active VCCs in which AAL5 frames are present (the "path mechanism").

A method consistent with the channel mechanism according to the present invention determines whether user data cells passing through a switch belong to a class of cells, each cell containing data having at least two states which indicate cell type, by monitoring the state of the data in each cell and identifying the cells as belonging to the class when the state of the data transitions from a first value to a second value.

Another method consistent with the channel mechanism according to the present invention is a method for controlling the congestion of cells on a path comprising at least one channel in a switch using a packet-aware cell discarding feature, where each cell includes data having at least two states. The method includes learning of the existence of active channels within the path by monitoring the header of cells, monitoring the state of the data in each cell received at the switch, identifying a change in the state of the data from a first cell to a subsequent cell, and enabling the packet-aware cell discarding feature for an active channel if the switch receives a cell associated with the channel with the data in a predetermined one of the two states.

In another embodiment of the present invention, a communications network is provided where the network includes a plurality of nodes sending and receiving cells, where each cell includes data having at least two states, a switch interconnecting the nodes, the switch including means for monitoring a state of the data in each cell, means for identifying a change in the state of the data from a first cell to a subsequent cell, and means for identifying associated cells carrying the data in both states when the state of the data transitions from a first value to a second value.

Apparatus and networks are also provided for carrying out methods consistent with the present invention. A memory is further provided for carrying out the methods consistent with the path mechanism according to the present invention.

The advantages accruing to the present invention are numerous. Automatic detection schemes consistent with the present invention, when integrated into an ATM switch, are cost-effective techniques for determining the type of traffic received at the switch. Advantageously, the present invention enhances the application of ATM packet-wise congestion control features such as PPD and EPD by providing mechanisms for enabling such features upon detection of an AAL5 frame. The inventive schemes function automatically and require no use of optional IEs or human intervention.

The above desires, and other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

Figure 1:
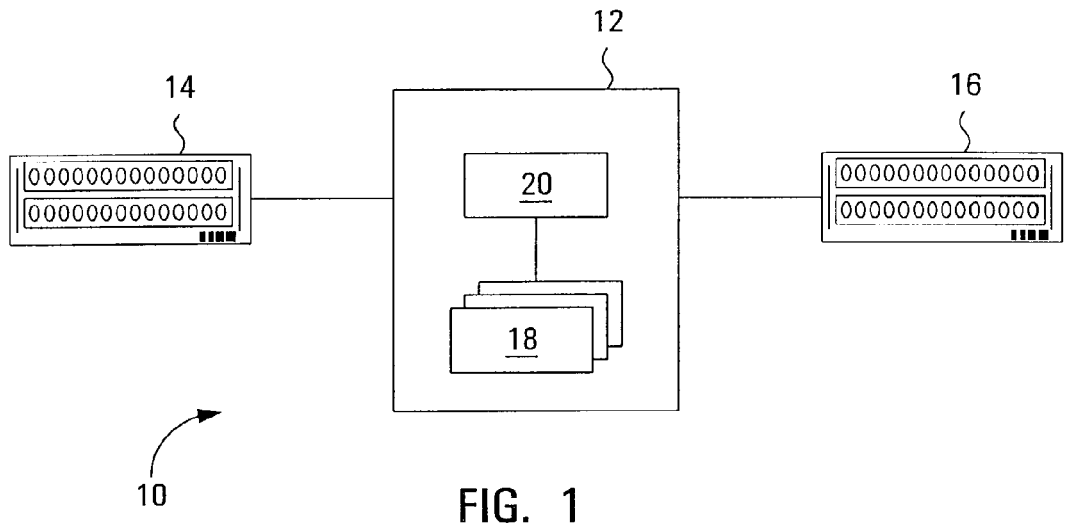
FIG. 1 is a high level diagram of an ATM network in which an automatic detection scheme for AAL5 frames consistent with the present invention may be implemented.

FIG. 1 depicts a high level block diagram of an ATM network, shown generally by reference numeral 10, within which an automatic detection scheme consistent with the present invention may function. Such a scheme may be implemented with any ATM layer device capable of carrying higher layer protocol units of data, e.g. AAL5 frames, that have been broken into smaller units, e.g. ATM cells. A typical example of such an ATM layer device is ATM switch 12, which transmits packets or frames of data split into ATM cells for transmission over network 10, using, e.g. AAL5. ATM switch 12, which may be one of a plurality of switches in network 10, not specifically shown for the sake of clarity, provides a switched connection between, for example, ATM routers 14 and 16, which in turn serve traffic from end systems or nodes, not particularly shown.

With continuing reference to FIG. 1, ATM switch 12 contains at least one buffer 18 which queues ATM cells passing through the switch. Buffers 18 may be input buffers or output buffers. Packet-aware discard strategies such as PPD and EPD drop ATM cells before or after they enter buffers 18. Consistent with the present invention, queue manager 20 manages buffer operations. More specifically, queue manager 20 contains a mechanism consistent with the present invention for enabling packet discard features such as PPD and EPD after determining that ATM cells passing through the switch belong to an AAL5 frame.

Figure 2:
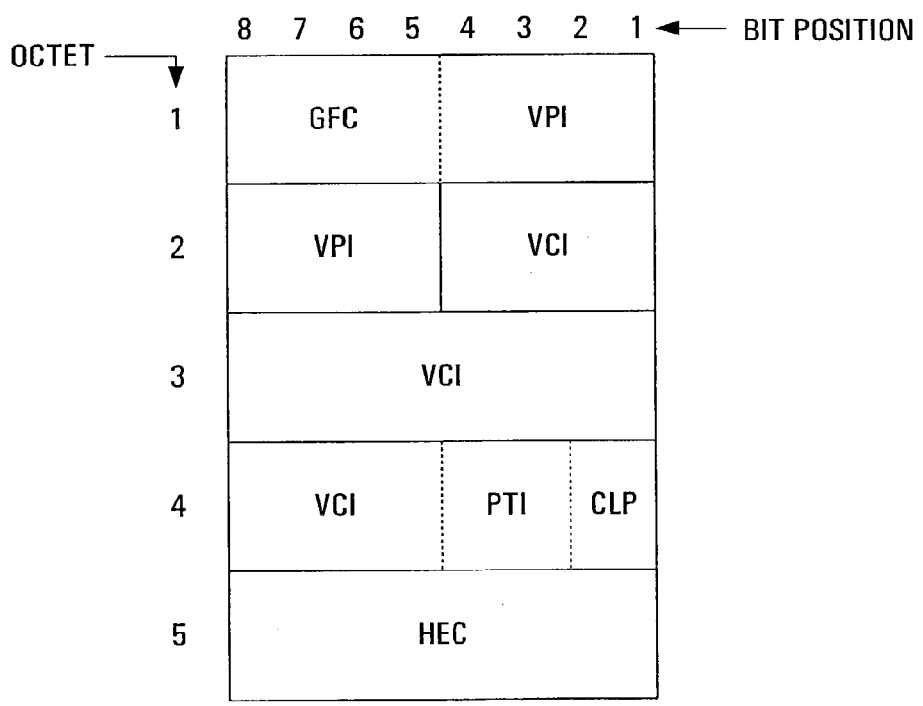
FIG. 2 illustrates the contents of an ATM cell header.

An ATM switch consistent with the present invention identifies ATM cells belonging to AAL5 frames by using the cell delineation characteristic present in AAL5-type ATM cells. Standard ATM cells are of a fixed length, i.e., 53 bytes, of which 48 bytes carry payload data and 5 bytes carry header information. FIG. 2 illustrates the contents of an ATM cell header according to the ATM Forum User-Network Interface (UNI) standard. The header contains a 4-bit Generic Flow Control (GFC) field, an 8-bit Virtual Path Identifier (VPI) field, a 16-bit Virtual Channel Identifier (VCI) field, a 3-bit Payload Type Identifier (PTI) field, a Cell Loss Priority (CLP) bit, and an 8-bit Header Error Control (HEC) field. The ATM Forum Network-Network Interface (NNI) standard header is similar, but the GFC field is replaced by an additional 4 bits in the VPI field.

The PTI field, which has eight possible values, performs several functions. The first bit (bit 4 of octet 4 in FIG. 2) distinguishes user data cells from management information cells. A value of "0" indicates a user data cell, whereas a value of "1" indicates a management cell. For user data cells, the second bit (bit 3 of octet 4 in FIG. 2) indicates whether the cell has encountered congestion. A value of "0" indicates no congestion has occurred, and a value of "1" indicates congestion. For user data cells, the third bit (bit 2 of octet 4 in FIG. 2) is used exclusively in ATM cells created from AAL5 frames to indicate whether a cell is the last cell of an AAL5 frame. A value of "0" indicates Continuation of Message (COM), i.e., there are more cells segmented from the frame, and a value of "1" indicates End of Message (EOM), i.e., the cell is the last one segmented from the frame. Table 1 below summarizes PTI values for user data cells, in which the first bit is always "0".

TABLE 1

| PTI Value | Congestion? | AAL5 frame indicator |
|---|---|---|
| 0 0 0 | No | More cells in the frame |
| 0 0 1 | No | Last cell in the frame |
| 0 1 0 | Yes | More cells in the frame |
| 0 1 1 | Yes | Last cell in the frame |

Figure 3:
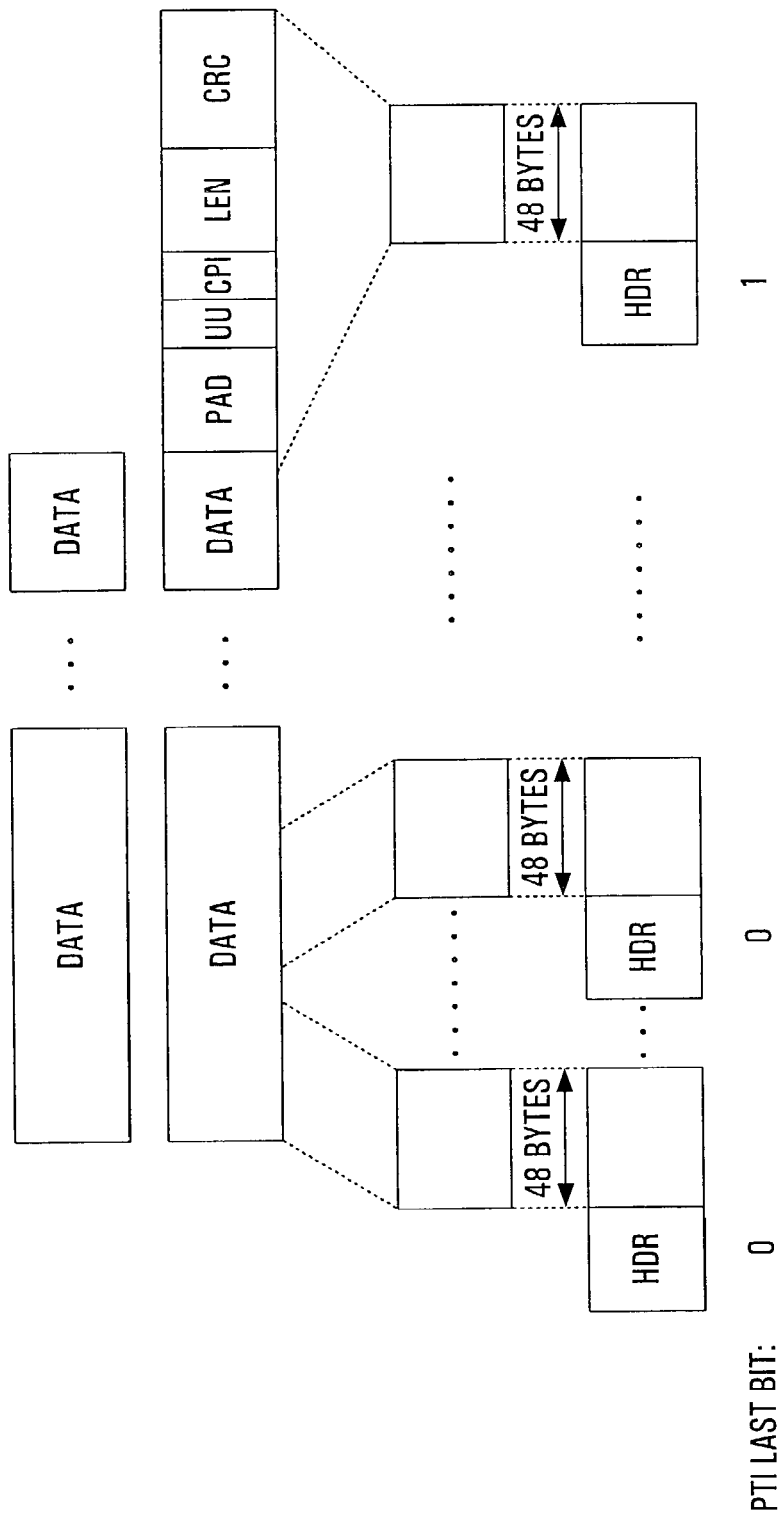
FIG. 3 illustrates the segmentation of a data packet into ATM cells according to the AAL5 protocol.

Referring now to FIG. 3, there is shown a segmentation of a data packet into ATM cells according to the AAL5 protocol. The AAL5 protocol operates by segmenting a large data unit into ATM cells. An ATM adapter, known in the art, adds trailer information to the data unit. The trailer consists of a 4-byte Cyclic Redundancy Check (CRC) field, a 2-byte packet length field (LEN), two reserved bytes for User-to-User information (UU) and the Common Part Indicator (CPI), and padding (PAD), such that the total length of the resulting packet is a multiple of 48 bytes. The adapter then segments the data into 48-byte units of information. Finally, a 5-byte ATM cell header (HDR) is added to each 48-byte unit to create 53-byte ATM cells. The last bit of the PTI field is set to 0, or COM, in every ATM cell except the last (i.e., the ATM cell containing the trailer), in which the last bit of the PTI field is set to 1, or EOM.

Referring once again to FIG. 1, queue manager 20 consistent with the present invention automatically detects the presence of ATM user data cells belonging to AAL5 frames by monitoring the transitions of the last bit of the PTI field as ATM cells pass through switch 12 on a virtual channel connection (VCC). This is possible since AAL5 is the only AAL type using the last PTI bit for any purpose in user data cells. When queue manager 20 observes a transition from 0 (COM) to 1 (EOM), it records the presence of AAL5 traffic. The queue manager or other mechanism within the switch can then use this knowledge to enable features, such as PPD and EPD and other features that apply only to AAL5 protocol.

Figure 4:
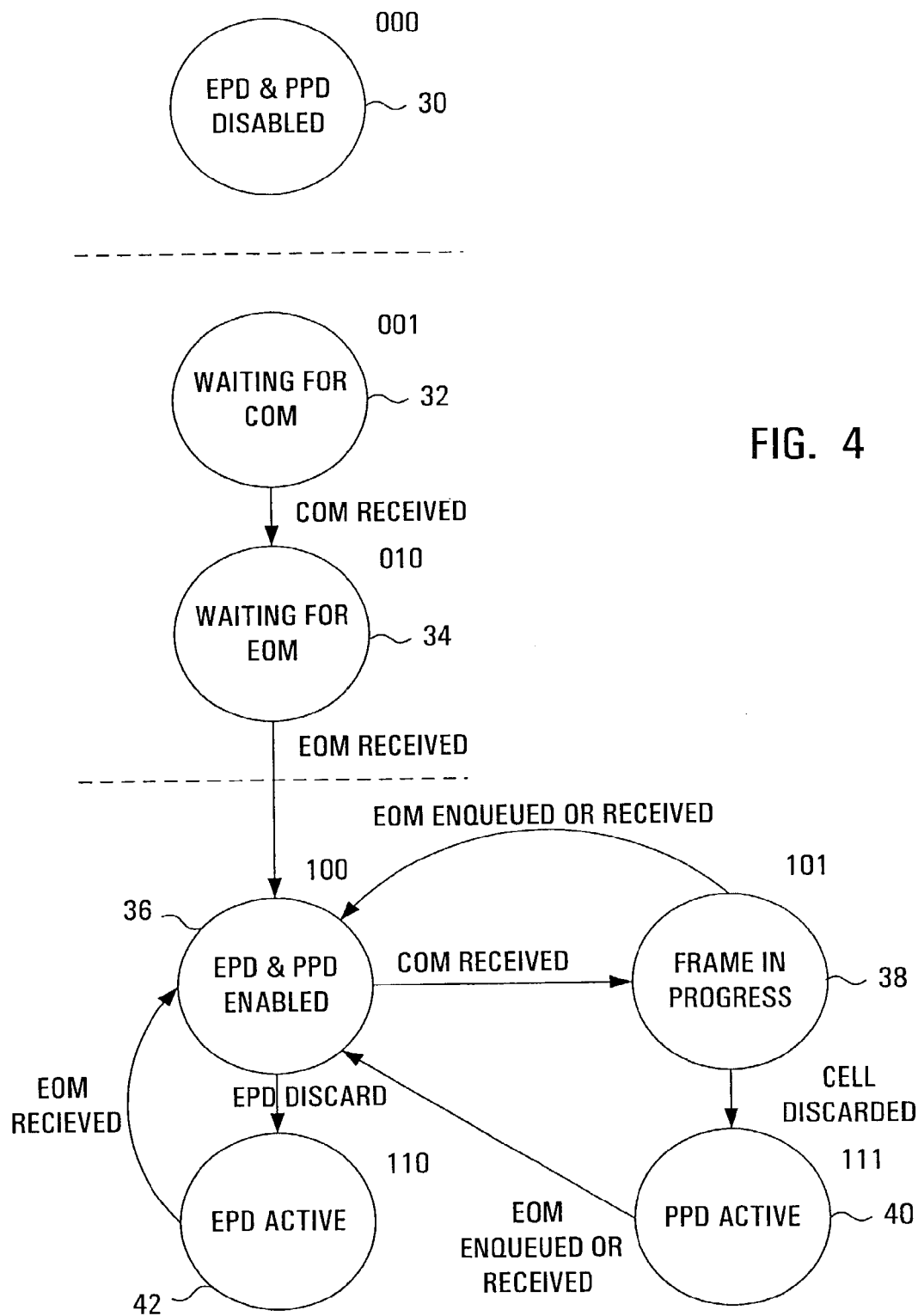
FIG. 4 represents a state diagram of enablement of cell discarding features consistent with the channel mechanism according to the present invention.

FIG. 4 is a state diagram illustrating states and transitions between them consistent with the VCC mechanism according to the present invention. In FIG. 4, the queue manager uses the automatic detection of AAL5 to enable packet discarding features such as PPD and EPD in the ATM switch. There are at least three sets of states in which the inventive channel mechanism may operate: packet discarding disabled, packet discarding conditionally enabled (i.e., the auto-detection states), and packet discarding enabled (i.e., PPD and EPD operating states).

When a connection is established and the ATM switch operator has knowledge that packet-wise discarding is inappropriate (e.g., when using a non-standard AAL which uses the last PTI bit for other purposes than delineating frames or, as described below, where the connection is a VPC) the operator disables packet discard techniques by placing the connection in state 30 ("EPD & PPD Disabled"). On the other hand, if the operator knows the cells are part of an AAL5 frame, the operator can enable packet discard techniques, placing the connection in the first operating state, i.e., state 36 ("EPD & PPD Enabled"), and bypassing the auto-detection states.

When the operator has no knowledge of the AAL type, however, the queue manager conditionally enables packet discarding on the connection, placing the connection into state 32 ("Waiting for COM"), the first auto-detection state. When a user data cell with "0" (COM) in the last PTI bit arrives, the queue manager transitions the connection to state 34, ("Waiting for EOM"). If the AAL type uses both COM and EOM in the PTI, as AAL5 does, then when a user data cell with "1" (EOM) in the last PTI bit arrives, the queue manager enables packet discarding, and the connection moves to the packet discarding operating states, described below.

Upon enablement of a packet discard state, either by the operator or as a result of detection of cells in an AAL5 frame, the connection is in state 36 ("EPD & PPD Enabled"). When a user data cell with the last PTI bit set to "0" (COM) arrives, the connection moves to state 38 ("Frame in Progress"). If the entire frame passes through the switch without any cells being discarded, the connection returns to state 36. This occurs when a cell with EOM is received or placed into a buffer queue ("EOM Enqueued or Received"). On the other hand, if the switch discards a cell for any reason before the entire frame passes, the switch activates the PPD feature, moving the connection from state 38 to state 40 ("PPD Active"). The PPD feature discards the remaining ATM cells belonging to the AAL5 frame. When the frame ends, i.e., a cell with EOM is received or placed into queue ("EOM Enqueued or Received"), the connection returns to state 36, with EPD and PPD enabled.

If the EPD feature discards a cell before the queue manager detects a COM (e.g., because the buffers cannot accommodate the entire frame), then the connection moves from state 36 immediately into state 42 ("EPD Active"). In this state, all remaining ATM cells from the AAL5 frame are discarded. Since the EPD feature discards the first cell from a frame and then all remaining cells, EPD discards an entire frame. When a cell with EOM arrives, the entire frame has been received, and the connection returns to state 36.

While the connection is in state 40 ("PPD Active"), or state 42 ("EPD Active"), the switch discards all received user data cells with the last PTI bit set to "0" (COM), i.e., any user data cell that is not the last from the frame. In state 42, the switch also discards any cell with EOM (i.e., the last cell in a frame), because EPD discards all cells in a frame, and no reassembly of the frame occurs downstream. In state 40 ("PPD Active"), however, the PPD feature will try to avoid discarding the last cell of a frame (i.e., the EOM cell) so as not to invalidate the reassembly of a subsequent frame at a downstream point. However, congestion at a switch may be too severe to allow even a single EOM cell to be sent on the connection. The switch's discard policy for AAL5 EOM cells, which may be less strict than the policy for AAL5 COM cells and non-AAL5 cells in order to reduce the likelihood of subsequent AAL5 frames being invalidated, determines whether to discard the EOM cell. In cases where the EOM cell must be discarded, the connection remains in state 40 ("PPD Active") instead of returning to state 36 ("EPD & PPD Enabled") since the reassembly of the subsequent frame has been invalidated by the passing of some COM cells of the current frame without a corresponding EOM cell.

It will be appreciated that the foregoing channel mechanism assumes that cells of different frames (packets) travel across the connection non-interleaved. While this is true in the context of a VCC, it cannot be said of the VPC within which the VCC operates.

Figure 5:
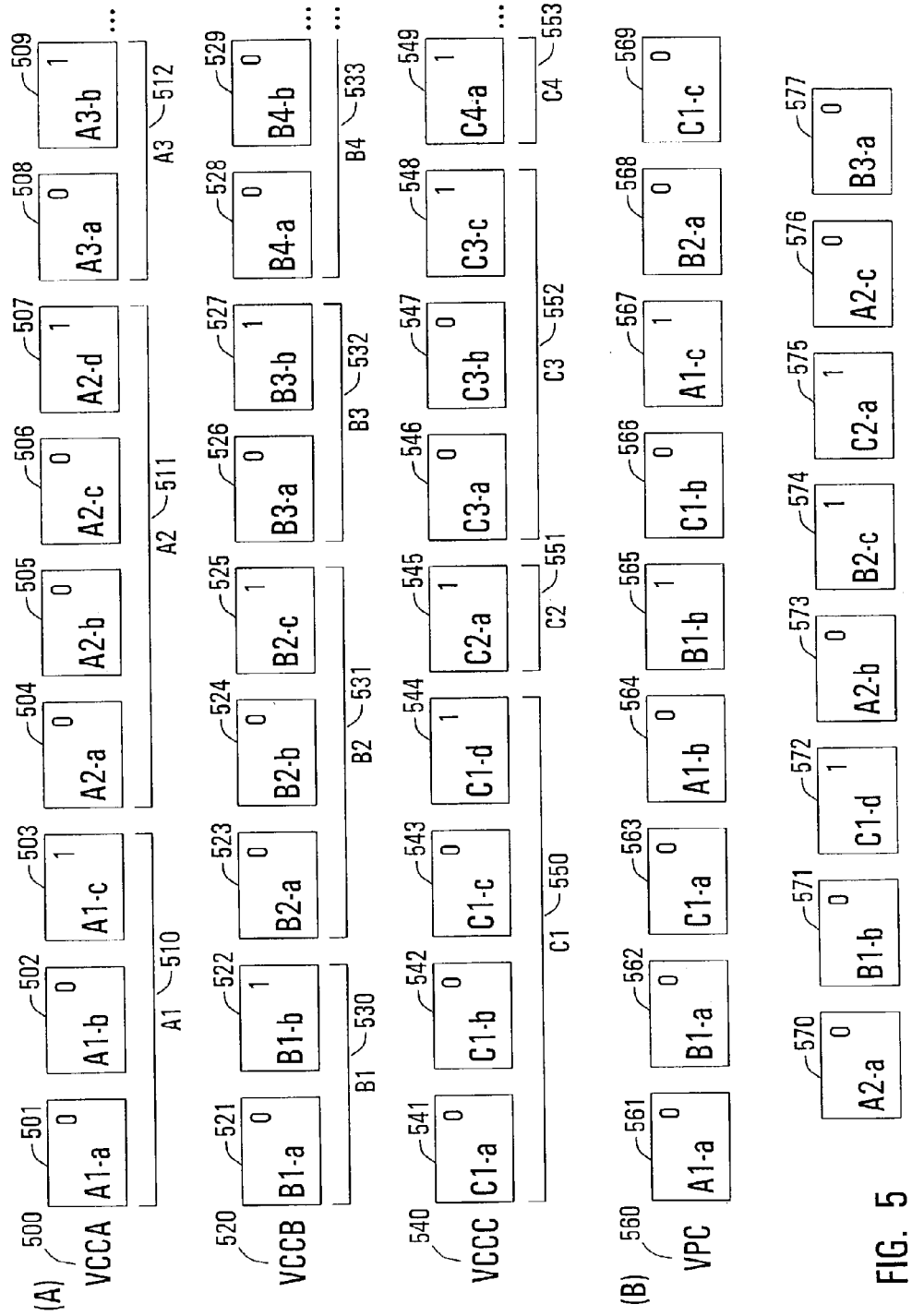
FIGS. 5(a) and (b) illustrate the interleaving of ATM cells for VCCs within a common VPC.
Figure 5:
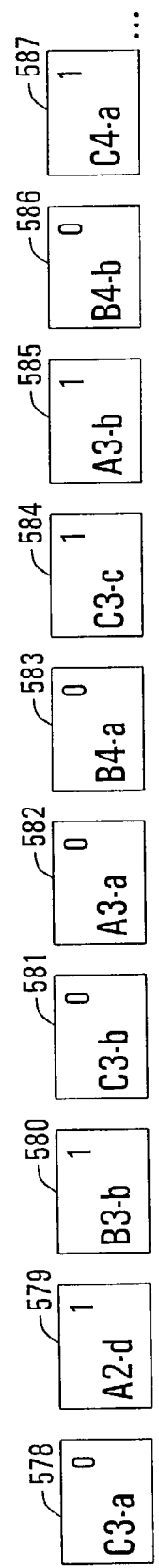

FIG. 5(a) illustrates a VPC and its associated VCCs, and demonstrates that from the point of view of a VPC, the cells from the various VCCs are interleaved. In the Figure there is shown, in exemplary fashion, three VCCs, designated VCC-A 500, VCC-B 520 and VCC-C 540, within a VPC 560. VCC-A 500 comprises a sequential stream of cells 501-509 which comprise a sequential series of AAL5-type frames 510-512, respectively designated A1 through A3. Similarly, VCC-B 520 comprises a sequential stream of cells 521-529 which comprise a sequential series of AAL5-type frames 530-533, respectively designated B1 through B4 (frame B4 is incomplete), and VCC-C 540 comprises a sequential stream of cells 541-549 which make up a sequential series of AAL5-type frames 550-553, respectively designated C1 through C4. The last bit of the PTI field, whether a 0 (COM) or a 1 (EOM) is shown in exemplary fashion in the top right corner of each cell.

Assuming that the VPC 560 queues cells relating to its active component VCCs such that a cell from each VCC is enqueued in turn, the ATM switch 12, corresponding to the VPC would contain cells in the order shown in FIG. 5(b). In reality, the asynchronous nature of the ATM network 10 is such that no such ordering is likely to occur.

Nevertheless, FIG. 5(b) aptly demonstrates the inapplicability of the VCC mechanism disclosed above to an ATM switch associated with a VPC. If, for instance, the VCC mechanism were to be applied to the data stream shown in FIG. 5(b), groups of cells 561-565, 566-567, 568-572, 573-574, 575, 576-579, 580, 581-584, 585, and 586-587 would erroneously be considered to each correspond to particular AAL5-type frames.

The interleaving of cells from different VCCs within a VPC requires that active VCCs should be distinguished from one another, both for the purpose of determining if AAL5 segmented data is being carried and of determining the type of packet-aware cell discarding feature which should be used when experiencing congestion.

Because the channel mechanism, which makes no such distinction, is inappropriate in the context of a VPC, the operator must accordingly keep the channel mechanism in state 30 ("EPD & PPD Disabled") for all VPC connections.

The path mechanism according to the present invention differs from the channel mechanism in that it must first learn which VCCs are active within a VPC before determining whether the active VCCs carry AAL5 segmented data and whether cell discard features may be applied to the data cells. Once the path mechanism learns which VCCs are active, it can automatically detect the presence of AAL5 frames along the active VCCs and apply packet-aware cell discarding features as appropriate.

Figure 6:
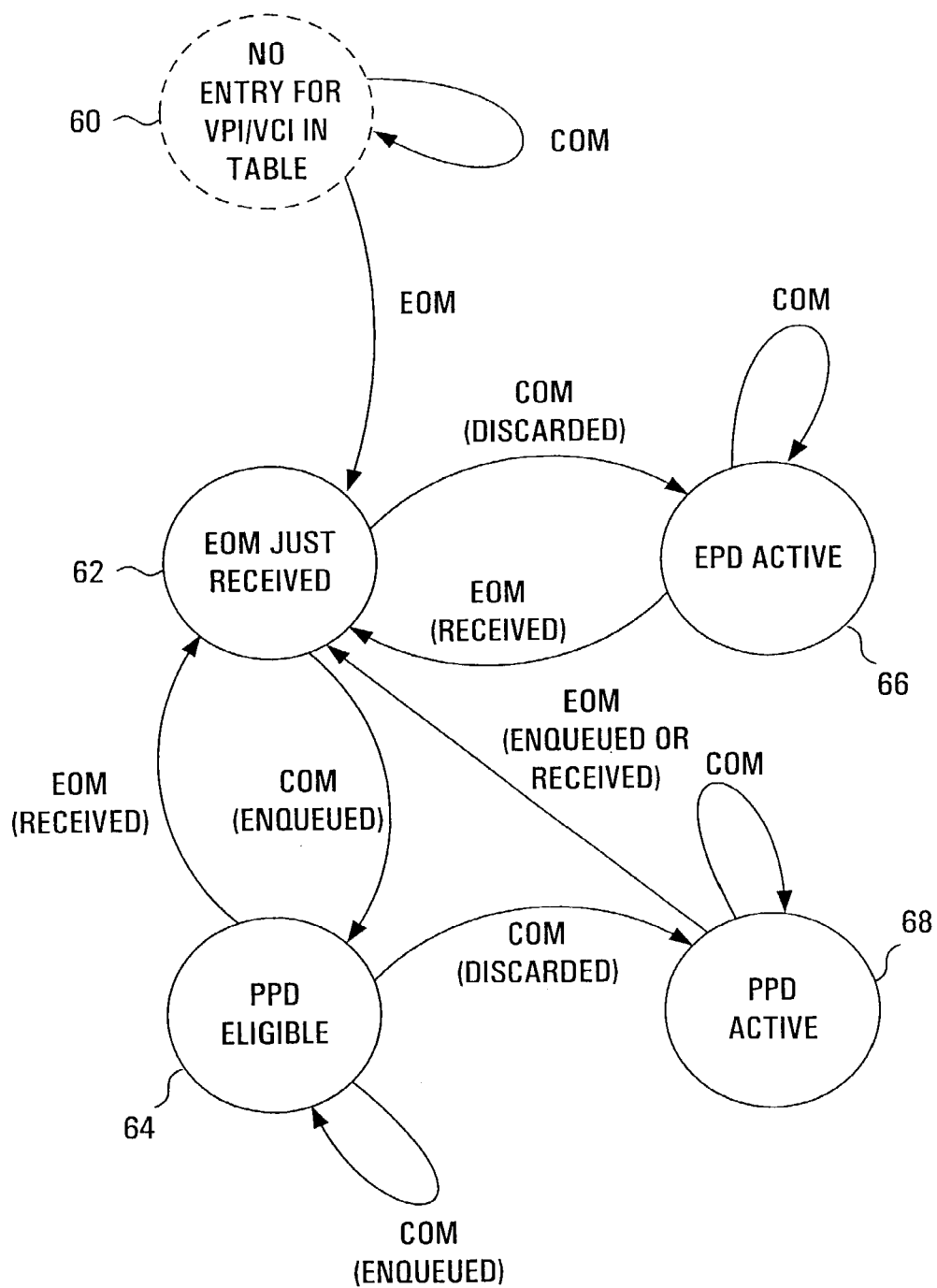
FIG. 6 represents a state diagram of enablement of packet-aware cell discarding features on a VPC switch consistent with the path mechanism according to the present invention.

FIG. 6 is a state diagram illustrating states and transitions between them consistent with the path mechanism according to the present invention. For each cell which is destined for a VPC, the queue manager monitors the VCI of the cell and identifies, from the VCI, to which VCC within the VPC the cell belongs. If the VCC is being monitored by an entry in a state table maintained in memory by the path mechanism, as described below, the last PTI bit is used to update the state 62, 64, 66, 68 for that VCC as to its suitability for application of packet-aware cell discarding congestion control techniques.

If no entry exists for the VCC 60, signifying that the VCC is not being monitored, and the last PTI bit in the cell is a "1", signifying an EOM (an "EOM cell") and thus, the potential existence of AAL5-type frames for the VCC, an attempt is made to create an entry for the VCC in the state table maintained in memory by the path mechanism so that the VCC may then be monitored. A cell in which the last PTI bit is a "0", signifying a COM (a "COM cell") observed on an unmonitored VCC is ignored.

Where the operator has knowledge that the VPC carries only AAL5 connections, an entry may be created for every unmonitored VCC that is identified by the arrival of a user cell bearing the VCC's link/VPI/VCI, whether or not the last PTI bit is a "0" (COM) or a "1" (EOM). In this alternative embodiment, the VCC would be placed in state 64 ("PPD eligible") if the entry is created upon the arrival of a COM cell which is not discarded and in state 68 ("PPD Active") upon the arrival of a COM cell which is discarded by the queue manager. If the entry is created upon the arrival of an EOM cell, the VCC would be placed in state 62 ("EOM Just Received").

The state table itself comprises a fixed number of entries in a fixed memory location. Entries in the state table are dynamically allocated to active VCCs which have PTI=1. The number of entries may range between one and the number of potential VCCs, but will preferably be a number which approximates the number of VCCs which are active at any given time within the VPC. In the preferred embodiment, the state of a plurality of VCC states are shared among a plurality of VPCs on a plurality of ATM links.

Each entry comprises sufficient data space to store the VCI and the Principal Connection Identifier which represents the link/VPC corresponding to the VCC, together with sufficient space to store the state information necessary to determine the suitability of applying packet-aware cell discarding congestion control techniques to the particular VCC. In the preferred embodiment, two bits are sufficient to store the state information, modeled by states 62, 64, 66 and 68 in FIG. 6. It will be apparent to those skilled in this art that a third bit would be necessary if differentiation between the situation where the user cells always set the PTI to 1 and AAL5 format. Table 2 summarizes the format of an entry within the state table of the preferred embodiment.

TABLE 2

| Description | Bit | Bit Description |
| --- | --- | --- |
| epd_ppd_state | 31:30 | (2) The EPD/PPD state the VCC is at |
| Key:APCI | 29:16 | The Principal Connection Identifier representing a VPC within a link |
| Key:VCI | 15:0 | (16) the Virtual Channel Identifier |

There are a number of methods by which an entry may be allocated to a particular VCC, including use of a hashing function, a linked list or linked list tree structure. In the preferred embodiment, the APCI/VCI of the cell is hashed to produce a pseudo-random index into an entry in the table. Where an APCI/VCI pair hashes to an entry which is already occupied by an active VCC, there is no search for the next available entry in the table. Rather, a determination is made whether to ignore the new VCC and continue with the old VCC or to remove the old VCC entry and proceed with monitoring the new VCC. In particular, if the state of the old VCC is not in state 66 ("EPD Active") nor in state 68 ("PPD Active"), monitoring of the old VCC is discontinued in favor of the new VCC. If, however, the state of the old VCC is in state 66 ("EPD Active") or state 68 ("PPD Active"), the new VCC is not monitored in favour of the old VCC.

To ensure that stale VCCs do not use up table entries indefinitely, monitoring of the old VCC may be discontinued on a statistical basis in an alternate embodiment in favour of the new VCC.

This approach has the advantage of computational simplicity in arriving at an entry and is suitable for a hardware implementation. Thus, where two active VCCs hash to the same entry, the state of an active VCC, that is, either the old VCC previously being monitored or the newly identified VCC, will not be monitored, so that packet-aware cell discarding techniques cannot be applied on the VCC which is no longer being monitored. Cells would still be discarded under congestion, but the connection would not benefit from the packet-aware cell discarding techniques. This would not be any different from the situation that would exist in the absence of the path mechanism according to the present invention.

It will be apparent to those skilled in this art that there may be user cells which do not use the last PTI bit and arbitrarily set this bit to "1", rather than "0", so that the only conclusive way to identify the existence of AAL5 traffic is to detect the presence of both COM cells and EOM cells. However, because the decision to monitor a VCC in the path mechanism according to the present invention requires the dynamic allocation of memory, monitoring of a VCC is commenced only when an EOM cell is detected bearing the VCC's APCI/VCI, at which point the VCC is placed into state 62 ("EOM Just Received"). There is no analog of state 32 ("Waiting for COM") and 34 ("Waiting for EOM") as shown in FIG. 4 in respect of the channel mechanism according to the present invention, where no memory allocation concern arises. In any event, a transition from state 63 ("EOM Just Received") to any of the other possible states of a monitored VCC under the path mechanism according to the present invention require the arrival of a COM cell bearing the VCC's APCI/VCI, so that the existence of AAL5 traffic will be unambiguously confirmed.

Referring once again to FIG. 6, for a particular monitored VCC, the initial state of the VCC, as a result of the detection of an EOM is state 62 ("EOM Just Received"). In the preferred embodiment the queue manager comprises memory for storing the state table and logic encoded in an ASIC for updating the state information and causing state transitions in accordance with the path mechanism according to the present invention as described below.

When a COM cell is observed on a monitored VCC in state 62 ("EOM Just Received"), the EPD threshold will be applied to admission because it is known that (a) the VCC is carrying AAL5-type frames and (b) that this is the first cell of a frame because an EOM was the previously observed cell on the VCC. If the COM is accepted, because the congestion level is below the EPD threshold, the VCC is placed in state 64 ("PPD Eligible"). If the COM is discarded, because the congestion level is above the EPD threshold, the VCC is placed in state 66 ("EPD Active").

When a COM cell is received on a currently monitored VCC in state 64 ("PPD Eligible"), the PPD threshold will be applied to admission because it is known that at least one cell of the frame has already been enqueued. If the cell is accepted, because the congestion level is below the PPD threshold, the VCC remains in state 64 ("PPD Eligible"). If the cell is discarded, because the congestion level is above the PPD threshold, the VCC is placed in state 68 ("PPD Active").

When a COM cell is observed on a currently monitored VCC in state 68 ("PPD Active") or state 66 ("EPD Active"), the cell is discarded because it is known that at least one of the cells of the frame has already been discarded, and the VCC remains in the same state.

When an EOM cell is received on a currently monitored VCC in state 66 ("EPD Active"), the cell is discarded because it is known that all of the cells of the frame have previously been discarded and that no downstream reassembly should be in progress. The VCC reverts to state 62 ("EOM Just Received").

When an EOM cell is observed on a currently monitored VCC in state 68 ("PPD Active"), the cell is accepted if possible (a more liberal LPD threshold is applied), because it is known that not all of the cells, if any, of the frame have been discarded and that the downstream reassembly will benefit from receiving the EOM in order to close off the reassembly. The VCC reverts to state 62 ("EOM Just Received"), unless the EOM cell must be discarded, in which case the connection remains in state 68 ("PPD Active"), since the reassembly of the subsequent frame has been invalidated by the passing of some COM cells of the current frame without a corresponding EOM cell.

When an EOM cell is observed on a currently monitored VCC in state 64 ("PPD Eligible"), the VCC reverts to state 62 ("EOM Just Received") whether or not the cell is accepted.

It will be apparent to those skilled in this art that if an EOM cell or a currently monitored VCC in state 64 ("PPD Eligible") is discarded, the following frame will be corrupted, forcing retransmissions and incurring additional bandwidth.

Although not shown in FIG. 6, this increase in bandwidth may be avoided by causing the VCC to pass into state 68 ("PPD Active") in such a situation, thereby immediately precipitating the discarding of the cells of the subsequent frame.

Although not shown in FIG. 6, the path mechanism may be enabled or disabled by the operator on a VPC basis.

It will be appreciated by those skilled in this art that various modifications and variations can be made to the automatic frame detection strategy described herein consistent with the present invention without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

What is claimed is:

1. A method for determining whether user data cells passing through a switch belong to a class of cells, each cell including data having at least two states, the method comprising:
   monitoring the state of the data in each cell;
   identifying a change in the state of the data from a first cell to a subsequent cell;
   identifying the cells as belonging to the class when the state of the data transitions from a first value to a second value; and
   in response to identifying the cells as belonging to the class, enabling a feature for the cells that applies to cells belonging to the class and not to cells belonging to a different class.

2. The method of claim 1, wherein the user data cells are asynchronous transfer mode (ATM) cells, and the data in each ATM cell has two states represented by a single data bit.

3. The method of claim 2, further comprising identifying the cells as belonging to AAL5 class.

4. A method for controlling the congestion of cells on a path comprising at least one channel in a switch using a packet-aware cell discarding feature, each cell including data having at least two states, the method comprising:
   learning of an existence of active channels within the path by monitoring headers of cells;
   monitoring the state of the data in each cell received at the switch;

identifying a change in the state of the data from a first cell to a subsequent cell; and enabling the packet-aware cell discarding feature for an active channel if the switch receives a cell associated with the active channel with the data in a predetermined one of the two states.

5. The method of claim 4, wherein the cells are asynchronous transfer mode (ATM) cells, and the data in each ATM cell has two states represented by a single data bit.

6. The method of claim 4, the method further comprising applying the packet-aware cell discarding feature for the active channel based on the state of the data within subsequent cells associated with the active channel.

7. The method of claim 4, further comprising enabling the packet-aware cell discarding feature if a cell is known to carry data in both states at the time a connection is established.

8. The method of claim 7, further comprising disabling the packet-aware cell discarding feature if it is known at the time the connection is established that operation of the packet discard feature is inappropriate.

9. The method of claim 6, wherein applying the packet-aware cell discarding feature further comprises:
   allocating memory to the active channel; and
   maintaining, in the memory, the state of subsequent cells received at the switch which are associated with the active channel.

10. The method of claim 9, wherein the memory is allocated dynamically.

11. The method of claim 9, wherein the memory is accessed by hashing information associated with the active channel to create an index into the memory.

12. The method of claim 11, wherein the information associated with the active channel comprises a channel identifier for the active channel.

13. The method of claim 11, wherein the information associated with the active channel comprises a path identifier for the active channel.

14. The method of claim 11, wherein the information associated with the active channel comprises a number of a link for the active channel.

15. A communications network comprising:
   a switch interconnecting a plurality of nodes sending and receiving cells, each cell including data having at least two states, the switch including:
      means for monitoring a state of the data in each cell;
      means for identifying a change in the state of the data from a first cell to a subsequent cell;
      means for identifying associated cells as belonging to a class of cells when the state of the data transitions from a first value to a second value; and
      means for enabling, in response to identifying the associated cells as belonging to the class, a feature for the associated cells that applies to cells belonging to the class and not to cells belonging to a different class.

16. The communications network of claim 15, wherein the cells are asynchronous transfer mode (ATM) cells, and the data in each ATM cell has two states represented by a single data bit.

17. The communications network of claim 15, further comprising means for identifying when a packet-aware cell discarding feature may be applied to the switch based on a state of the data within at least one of two or more associated cells.

18. The communications network of claim 17, wherein the means for identifying when the packet-aware cell discarding feature may be applied to the switch based on a state of the data within at least one of two or more associated cells further comprises:
   means for enabling the packet-aware cell discarding feature when the packet-aware cell discarding feature has been conditionally enabled and the switch receives a cell with the data in a predetermined one of the two states.

19. The communications network of claim 18, further comprising means for disabling the packet-aware cell discarding feature if it is known at the time a connection is established that operation of the packet-aware cell discarding feature is inappropriate.

20. The communications network of claim 15, further comprising means for identifying the cells as belonging to AAL5 class.

21. The method of claim 1, wherein the feature comprises a packet-aware cell discarding feature.

* * * * *